US011208268B2

(12) United States Patent
Knapp

(10) Patent No.: US 11,208,268 B2
(45) Date of Patent: Dec. 28, 2021

(54) TRANSPORT SYSTEM FOR TRANSPORTING AND/OR POSITIONING OBJECTS ALONG A TRANSPORT ROUTE, AND TRANSPORT BODY FOR SUCH A TRANSPORT SYSTEM

(71) Applicant: GLOBAL SYSTEMS SOLUTIONS GMBH, Odenwald (DE)

(72) Inventor: Thomas Knapp, Mudau (DE)

(73) Assignee: GLOBAL SYSTEMS SOLUTIONS GMBH, Buchen/Odenwald (DE)

( * ) Notice: Subject to any disclaimer, the term of this patent is extended or adjusted under 35 U.S.C. 154(b) by 0 days.

(21) Appl. No.: 17/262,434

(22) PCT Filed: Jul. 19, 2019

(86) PCT No.: PCT/EP2019/000224
§ 371 (c)(1),
(2) Date: Jan. 22, 2021

(87) PCT Pub. No.: WO2020/030294
PCT Pub. Date: Feb. 13, 2020

(65) Prior Publication Data
US 2021/0292095 A1 Sep. 23, 2021

(30) Foreign Application Priority Data

Aug. 8, 2018 (DE) .......................... 10 2018 006 257
Oct. 8, 2018 (DE) .......................... 10 2018 007 909

(51) Int. Cl.
*B65G 35/06* (2006.01)

(52) U.S. Cl.
CPC .................................. *B65G 35/066* (2013.01)

(58) Field of Classification Search
CPC ...... B65G 35/06; B65G 35/066; B65G 23/20; B65G 33/02; B65G 33/04; B65G 33/06;
(Continued)

(56) References Cited

U.S. PATENT DOCUMENTS 595,508 A * 12/1897 Doe .......................... F16H 1/16
74/425
2,223,639 A * 12/1940 Ponder ................... B65G 23/20
198/832
(Continued)

FOREIGN PATENT DOCUMENTS

DE 2048246 4/1971
DE 4445748 A1 6/1996
(Continued)

*Primary Examiner* — Joseph A Dillon, Jr.
(74) *Attorney, Agent, or Firm* — Hudak, Shunk & Farine Co. LPA

(57) ABSTRACT

A transport system for transporting and/or positioning objects along a transport section, wherein the transport system includes at least one rotatable transport body having at least one curved transport path which is delimited by at least one curve flank pair and, as seen in the linear transport direction, has at least one positive curved transport path pitch throughout and into which there can engage or there engages at least one pusher dog of a carrier that is movable along the transport section, wherein the at least one transport body has at least one entry region for the entry of the at least one pusher dog into the curved transport path. A transport body for a transport system, wherein the transport body has an entry end and an exit end, at least one ascending curved transport path which is delimited by at least one curve flank pair and has at least one positive curved transport path pitch, and at least one entry region for the entry of at least one pusher dog of a carrier of the transport system into the curved transport path.

19 Claims, 3 Drawing Sheets

(58) Field of Classification Search
CPC ... B65G 33/065; B23Q 7/1473; B23Q 7/1452
USPC ...... 198/465.1, 465.2, 467.1, 625, 661, 786, 198/832
See application file for complete search history.

(56) References Cited

U.S. PATENT DOCUMENTS

| | | | | |
|---|---|---|---|---|
| 3,002,604 | A * | 10/1961 | Brems | B65G 23/00 198/832 |
| 4,650,066 | A * | 3/1987 | Bradbury | B65G 17/086 198/832 |
| 5,097,935 | A * | 3/1992 | Weiss | B23Q 7/005 198/345.3 |
| 5,161,664 | A * | 11/1992 | LeBras | B65G 47/082 198/418.7 |
| 5,871,081 | A * | 2/1999 | Gaalswyk | G01F 13/005 198/662 |
| 5,911,305 | A * | 6/1999 | Layne | B65G 23/20 198/832 |
| 6,119,848 | A * | 9/2000 | Hartness, III | B65G 23/14 198/833 |
| 6,325,204 | B1 * | 12/2001 | Zurcher | B65G 23/20 198/792 |
| 7,971,703 | B2 * | 7/2011 | Sato | B65G 33/265 198/625 |
| 7,971,706 | B2 * | 7/2011 | Ozaki | B65G 23/20 198/835 |
| 8,789,685 | B2 * | 7/2014 | Li | B65G 13/071 198/786 |
| 8,794,427 | B2 * | 8/2014 | Lofaro | H01L 21/68785 198/617 |
| 9,927,012 | B2 * | 3/2018 | Chicurel Y Uziel | F16H 7/06 |
| 10,059,528 | B2 * | 8/2018 | Timmins | B65G 47/30 |
| 10,889,446 | B2 * | 1/2021 | Barry | B65G 19/14 |
| 10,935,106 | B2 * | 3/2021 | Adams, Jr. | B66F 3/18 |
| 2006/0021853 | A1 * | 2/2006 | Kato | H01L 21/67706 198/465.2 |
| 2007/0000757 | A1 * | 1/2007 | Tabler | B65G 35/066 198/465.4 |
| 2014/0048386 | A1 * | 2/2014 | Brunee | B65G 19/02 198/467.1 |
| 2014/0299449 | A1 * | 10/2014 | Ishii | B61B 13/02 198/620 |
| 2017/0073167 | A1 * | 3/2017 | Ookada | B65G 49/0422 |
| 2017/0137228 | A1 * | 5/2017 | Kyotani | B65G 35/00 |
| 2017/0190514 | A1 * | 7/2017 | Weiss | B23Q 7/1463 |
| 2017/0327319 | A1 * | 11/2017 | Kato | B65G 33/06 |
| 2019/0276242 | A1 * | 9/2019 | Matsumoto | B65G 23/26 |
| 2019/0375530 | A1 * | 12/2019 | Mora Flores | B65B 43/32 |
| 2020/0165069 | A1 * | 5/2020 | Gotzinger | B65G 35/06 |
| 2021/0024295 | A1 * | 1/2021 | Stiegler | B65G 35/08 |

FOREIGN PATENT DOCUMENTS

| | | |
|---|---|---|
| DE | 19716779 A1 | 10/1998 |
| DE | 102014107654 A1 | 12/2015 |
| EP | 0424562 A1 | 5/1991 |
| JP | 6359125 | 4/1988 |
| JP | 05043032 A | 2/1993 |
| JP | 06293432 A | 10/1994 |
| WO | 80/00559 A1 | 4/1980 |
| WO | 2013/184917 A1 | 12/2013 |

* cited by examiner

TRANSPORT SYSTEM FOR TRANSPORTING AND/OR POSITIONING OBJECTS ALONG A TRANSPORT ROUTE, AND TRANSPORT BODY FOR SUCH A TRANSPORT SYSTEM

FIELD OF THE INVENTION

The invention relates to a transport system for transporting and/or positioning objects along a transport route, wherein the transport system comprises at least one rotatable transport body having at least one curved transport path which is delimited by at least one curve flank pair and, as seen in the linear transport direction, has at least one positive curved transport path pitch throughout and into which there can engage or there engages at least one pusher dog of a carrier that is movable along the transport section, wherein the at least one transport body has at least one entry region for the entry of the at least one pusher dog into the curved transport path. It relates further to a transport body for a transport system, wherein the transport body has an entry end and an exit end, at least one ascending curved transport path which is delimited by at least one curve flank pair and has at least one positive curved transport path pitch, and at least one entry region for the entry of at least one pusher dog of a carrier of the transport system into the curved transport path.

BACKGROUND OF THE INVENTION

Transport systems for transporting objects along a transport section, and transport bodies as parts of such a transport system, are known in the prior art. The transport bodies can thereby be rotatable or fixed. Movable carriers, which have in particular roller-like pusher dogs, can be moved along such a transport section by means of the transport system in order to pick up the objects to be transported and bring them, for example, to individual stations of a manufacturing installation. The roller-like pusher dogs engage into a curved transport path which extends along a respective transport body and loops around it in a helical manner. Such transport systems therefore perform a central function in the automation of production lines for the production of a wide variety of products. Different types of transport system are known in the prior art for different applications. The individual transport bodies can thereby be fixed, for example, to or between conveyor chains, conveyor belts, conveyor rods, conveyor systems, etc. and be arranged to revolve together therewith along a transport section.

It is further known from DE 10 2014 107 654 A1 to provide a drive unit for driving a carrier that is movable along a transport path with a barrel cam which can be driven to perform a rotational movement. A drive groove for the engagement of a pusher dog arranged on the carrier is thereby provided on the barrel cam. This barrel cam comprises a first barrel portion and a second barrel portion separate therefrom, wherein the two barrel portions can be driven independently of one another. A control device which is likewise provided for controlling the drive of the carrier is so configured that it can accelerate the carrier after it has been taken over from a separate drive unit by means of the first barrel portion and supplies the accelerated carrier to the second barrel portion. Sensors are further provided on the drive units for detecting the speeds and the respective instantaneous rotational position of the barrel portions. The barrel cam is arranged between a transfer portion and a process portion, wherein the control device drives the second barrel portion in rotation in such a manner that it is driven with a speed of rotation that is adapted to the process portion. For taking over the carrier from the respective transfer portion, the barrel cam has the first barrel portion, which is initially stationary for taking over the carrier from the transfer portion. As soon as the pusher dog arranged on the carrier moves from a straight portion, which extends parallel to a transport direction of the carriage and/or parallel to an axis of rotation of the barrel cam, in the inlet-side introduction region of the barrel portion into the spirally extending portion thereof, the first barrel portion is driven to perform a rotational movement. This is accelerated until the speed of rotation of the first barrel portion corresponds to the speed of rotation of the second barrel portion and an outlet region of the spirally extending portion of the first barrel portion and an inlet region of the barrel portion merge into one another. The first barrel portion and the second barrel portion are thus synchronized in order to permit jerk-free transfer of the pusher dog of the carrier from the first barrel portion into the second barrel portion.

EP 0 424 562 A1 discloses two conveyor belts for pallets and a so-called roller. Each pallet has on its underside a protruding pusher dog in the form of a guide roller, wherein these pusher dogs fit into a guide groove in the roller. The roller is arranged centrally between the conveyor belts. In the standstill position of the roller, the guide groove has different groove portions which are open on the inside via an axial entry portion (pick-up position of the next pallet) and an axial exit portion. The two groove portions each form a stop in the transport direction, which fixes the pallet in the working position and in the pick-up position.

From DE 44 45 748 A1 there is known a pallet locking system in which rollers are initially present in some regions parallel to the conveying direction of a conveyor path, which rollers have a guide groove into which a guide element on the respective pallets can engage and cooperate therewith. The respective guide groove of the roller has in its two end regions, and thus also in the entry region, groove regions for locking, which extend radially, that is to say perpendicularly to the axis of rotation, in some regions and, therebetween, spirally extending groove regions for transportation. The roller is controlled in terms of its speed by means of a control device via an intermittent motion system.

Specifically the movement of a pusher dog into a curved transport path which is turning due to the rotation of the transport body and ascends positively in the linear transport direction, or even when it is at a standstill, is found to be difficult, depending on the form of the entry into the curved transport path. In contrast to the prior art, where there is at the entry, for the feeding in, a groove region extending parallel to the axis of rotation according to DE 10 2014 107 654 A1, or where there is at the entry, for the feeding in, a groove region extending perpendicularly to the axis of rotation according to EP 0 424 562 A1 or according to DE 44 45 748 A1, the contact point of the pusher dog in the entry region of the transport body is always located at a groove face or groove flank that extends obliquely relative to the linear transport direction. In the case of a rapid start of the rotational movement of the rotatable transport body and thus of the curved transport path thereof, the obliquely extending groove flank moves away from the pusher dog, which stops as a result of mass inertia or at least follows more slowly, of the carrier for transporting objects along the transport section, before the second groove flank, which approaches the pusher dog from above in the direction of rotation, reaches the pusher dog. During this beginning movement phase of the pusher dog, this starting region of the second groove flank strikes the pusher dog from above. The pusher dog is then pushed suddenly against the first groove flank, which is leading in the transport direction, of the curved transport path. This leads to a very sudden, jerky and wear-prone movement of the carrier that is movable along the transport section by means of the transport system and to which the pusher dog is fastened. The disadvantageous movement sequence is transmitted directly to the object located on the carrier and can thus lead to damage to the object and to the object moving on the carrier, which can ultimately result in downtimes and losses in terms of output in a manufacturing installation.

SUMMARY OF THE INVENTION

Accordingly, the object underlying the present invention is to provide a transport system for transporting and/or positioning objects along a transport section, wherein the transport system comprises at least one rotatable transport body having an entry end and an exit end and having at least one curved transport path which is delimited by at least one curve flank pair and has a positive curved transport path pitch in the linear transport direction, wherein at least one pusher dog of a carrier that is movable along the transport section can engage or engages into the curved transport path, and to provide a transport body for such a transport system, in which a more gentle, jerk-free and wear-optimized movement of the movable carrier, to which the pusher dogs are fastened, is made possible.

The object is achieved for a transport system for transporting and/or positioning objects along a transport section, wherein the transport system comprises at least one rotatable transport body having an entry end and an exit end and having at least one ascending curved transport path which is delimited by at least one curve flank pair and which has at least one positive curved transport path pitch (S) in the linear transport direction and into which there can engage or there engages at least one pusher dog of a carrier that is movable along the transport section, wherein the at least one transport body has at least one entry region for the entry of the at least one pusher dog into the curved transport path in that only one of the curve flanks of the curve flank pair is provided in the entry region, wherein this first curve flank ascends with a positive pitch from the entry end of the transport body and merges with an offset portion into the curved transport path delimited by the two curve flanks and ascending with the positive curved transport path pitch. For a transport body for a transport system, wherein the transport body has an entry end and an exit end, at least one ascending curved transport path which is delimited by at least one curve flank pair and has in the linear transport direction at least one positive curved transport path pitch (S), and at least one entry region for the entry of at least one pusher dog of a carrier of the transport system into the curved transport path, the object is achieved in that, in the entry region of the transport body, a first curve flank is in advance of the second curve flank of the curve flank pair, wherein only the leading first curve flank of the curve flank pair is provided in the entry region, wherein that first curve flank ascends with a positive pitch from the entry end of the transport body and merges with an offset portion into the curved transport path delimited by the two curve flanks and ascending with the positive curved transport path pitch. Further developments of the invention are defined in the dependent claims.

There is thereby provided a transport system for transporting and/or positioning objects along a transport section, which transport system comprises one or more transport bodies, wherein the transport bodies are each provided with at least one curved transport path. The curved transport path is delimited at the edges by two curve flanks, which together are referred to hereinbelow as a curve flank pair. The curved transport path, as seen in the linear transport direction, has a positive curved transport path pitch throughout, in order to be able to linearly move pusher dogs, such as in particular roller-like pusher dogs, of a carrier that is movable along the transport section, which have entered the curved transport path at the entry end of the transport body. A carrier is understood as being any type of device for supporting, carrying and for transporting a wide variety of objects, that is to say, for example, a pallet, a carriage, a cart, a shuttle, etc. For moving a carrier along the transport section by means of the transport system, the carrier has at least one pusher dog. If, for example, two pusher dogs are provided, they are in most cases arranged on the carrier spaced apart from one another and accordingly enter the curved transport path of the transport body one after the other, whereby they are moved linearly in the transport direction along the curved transport path of the rotatable transport body by the rotational movement thereof. At the exit end of the transport body, the pusher dogs of the carrier then leave the curved transport path again and either are drawn into the entry region of an adjacent transport body or the carrier with its pusher dogs otherwise moves further along the transport section.

Only one of the two curve flanks of the curve flank pair of the curved transport path of the transport body is provided in the entry region of the transport body. This first curve flank is thus in advance of the second curve flank in the transport direction of the carrier along the transport section, or also in advance of the transport body. In order to move the first contact region of the respective pusher dog with the curved transport path further into the transport body, or in order to move it as far as possible into the transport body, in order to create a larger entry region and thus more space for the entry and feeding of the respective pusher dog into the curved transport path, this first leading curve flank of the curve flank pair ascends with the positive pitch from the entry end of the transport body, merges into the offset portion and subsequently into the curved transport path delimited by the two curve flanks and having the positive curved transport path pitch. The offset portion offsets the first curve flank in the direction towards the entry end of the transport body. The first curve flank can ascend with the positive curved transport path pitch before and after the offset portion, the positive pitch can therefore correspond to the positive transport curve pitch. It is further possible that the first curve flank ascends before the offset portion with a positive pitch that is different from the positive curved transport path pitch; the positive pitch with which the first curve flank ascends from the entry end of the transport body is thus not equal to the positive curved transport path pitch of the ascending curved transport path. The offset portion can have a pitch that is infinite, negative or that at least exceeds the positive curved transport path pitch. The latter is in particular a comparatively large pitch, which is greater than the positive curved transport path pitch and smaller than infinite. The respective pusher dog, after it has entered the entry region, meets this offset portion. The pusher dog can optionally first run onto the ascending first curve flank and follow it as far as the offset portion. Since the second following curve flank of the curve flank pair is not yet arranged in the region of this offset portion of the first leading curve flank, a free space is created for the respective pusher dog to enter and to meet the offset portion. On further rotation of the transport body, the second following curve flank of the curved transport path is applied tangentially laterally against the pusher dog, which, after leaving the offset portion of the first leading curve flank, moves into the curved transport path. By the provision of the offset portion, the first curve flank supplies the pusher dog to the second curve flank, or the curved transport path, and thereby feeds the pusher dog into the curved transport path. With the tangential application of the second curve flank against the pusher dog, the pusher dog is no longer subject to an impact, unlike in the known solutions. Since the respective pusher dog is arrested by the offset portion of the first leading curve flank of the curve flank pair and, owing to the large pitch of the offset portion, is not yet moved in the transport direction, the pusher dog can enter the curved transport path, between the two curve flanks thereof, with a gentle movement and thereby be prevented from making a sudden movement. Accordingly, a gentle, jerk-free and wear-optimized movement of the movable carrier, to which the at least one pusher dog is fastened, along the transport body, or the transport system which comprises at least one such transport body, is possible.

Advantageously, the second curve flank of the curve flank pair, that is to say the following curve flank, with the positive curved transport path pitch begins at the level of a transition region of the first curve flank from the offset portion into the curved transport path ascending with the positive curved transport path pitch. The transition region can be configured either as a direct transition from the pitch of the offset portion of the first curve flank into the positive curved transport path pitch, or can be elongate and straight, as a traverse or curved path. The second curve flank of the curve flank pair can begin, originate or start either in that transition region or, depending on the length of the transition region, at the end thereof, that is to say in the region in which the first curve flank merges into the positive curved transport path pitch. The two curve flanks, the first curve flank and the second curve flank, of the curve flank pair form, after the second curve flank following the first curve flank of the curve flank pair has joined, the curved transport path with the positive curved transport path pitch, accordingly extend at least substantially parallel to one another, wherein the respective pusher dog of the carrier is carried along between the two curve flanks of the curve flank pair which define the curved transport path.

Both the entry region and the curved transport path can be milled into the respective transport bodies in an inexpensive manner in the form of grooves. The curved transport path can accordingly be configured as at least one groove or in the manner of a groove with two curve flanks of the curve flank pair. The provision of a groove is found to be a simple and effective possibility, for the engagement of the pusher dogs of a carrier for transporting objects along the transport system, or a transport section, for carrying along the pusher dogs. Instead of a groove, raised regions could in principle also be provided on the transport body, which raised regions are in the form of paths, for forming the curved transport path with the curve flanks of the curve flank pair that flank, delimit and define the curved transport path. Such curved paths delimited at the edges by web portions or beads are also referred to as a web or bead curve. The curved transport path of the transport body can accordingly be configured as a grooved curve and/or web curve and/or bead curve or in the manner of a groove with two curve flanks of the curve flank pair.

The curved transport path pitch of the curved transport path that is positive throughout in the linear transport direction can be constant at least in some regions. In particular, it is possible to provide either a positive pitch of the curved transport path that is constant, as seen in the linear transport direction, or a positive pitch that changes over the longitudinal extent of the transport body. By changing the curved transport path pitch, the transport movement of the pusher dogs, which are moved along the curved transport path of the transport body in the transport direction, can be determined and purposively changed. This takes place in such a manner that it is adapted to the particular desired movements of the objects moved via the transport system and to individual manufacturing stations, for example of a manufacturing installation, or between them.

The curved transport path of the transport body can be in the form of, for example, a cylinder or barrel curve, that is to say rectangular in cross-section, and/or a globoid curve, that is to say trapezoidal in cross-section. Mixed forms are of course also possible.

A revolving transport section can comprise at least one transport body and at least one transfer section, which can be connectable or connected to one another. The at least one transfer section and/or the transport bodies can be provided with or without their own drive device. The at least two transport bodies can be or are in particular provided as a whole module with only one drive device. There can be provided, for example, conveyor belts, conveyor chains, conveyor rods or other elements forming a transfer section, which are provided with or without an additional drive device and which are deflected in particular about at least two transport direction reversal points in order to form the revolving transport section. Where only one transport body is provided, the transfer section is connected on the one hand to the entry end and on the other hand to the exit end of the transport body. If more than one transport body is provided, transfer sections can be provided between the at least two transport bodies. By the provision of the at least one transport body and the at least one transfer section, segmentation, or a modular construction, of the transport system is provided, as a result of which large variability in terms of construction and thus a flexible combination of transport bodies and transfer sections for forming a transport section that is suitably adapted for a particular use is possible.

The entry region of the transport body serves to feed the respective pusher dog into the curved transport path, which ascends with at least one positive curved transport path pitch, of the transport body. By the provision of the offset portion of the first curve flank in the entry region, the respective pusher dog of a carrier that is movable along the transport section for transporting objects can optimally be directed into the curved transport path of the transport body, so that no further measures are required for pre-positioning the carrier, as is the case in the solutions of the prior art. When at least two pusher dogs are rigidly connected, spaced apart from one another, to the carrier and the at least two pusher dogs are to follow a movement path, namely the curved transport path of the respective transport body, each pusher dog, owing to the particular form of the entry region, can be drawn or received into the curved transport path without difficulty even when the transport body is rotating, that is to say during the continuous movement thereof, without the risk of jamming or even breaking, which can occur especially in the case of two curved transport path portions which do not run in parallel or if the pusher dogs attempt to engage into two adjacent transport bodies. The respective pusher dog, which can be in the form of a roller, for example, is applied against the first curve flank, which ascends with a positive pitch as far as the offset portion, up to the offset portion, which has a significantly higher pitch compared to the pitch of the curved transport path, in particular a pitch of infinite, or even a negative pitch, and then, after the second curve flank of the curve flank pair has joined, follows the course of the curved transport path with its positive curved transport path pitch.

Because the first curve flank initially ascends with a positive pitch, the offset of the offset portion with the very large pitch, in particular an infinite pitch, wherein this offset portion of the first curve flank in this case extends at an angle of approximately 90° to the longitudinal extent of the transport body, or even a negative pitch, the pusher dog is supplied continuously along the first curve flank of the curve flank pair of the curved transport path, similarly to the case of a funnel, in contrast to the prior art. It can thereby be ensured that the respective pusher dog still lies against the first curve flank before the second curve flank arrives, so that undesirable impact stress on the pusher dog by the second curve flank, or the portion of the transport body comprising it, can reliably be prevented. Thus, as soon as the pusher dog reaches the offset portion of the first curve flank, the pusher dog can no longer unintentionally be pushed out of the entry region, or move inwards, as a result of the second curve flank engaging tangentially with the pusher dog on further movement or rotation of the transport body, but instead it is securely conveyed into the curved transport path. As a result, it is possible to provide a higher speed of rotation of the respective transport body without the risk of damage to the pusher dog or in particular the second curve flank of the curve flank pair. This is also possible in particular as a result of the fact that a curved transport path with a pitch of zero is not provided in the entry region, but rather the second curve flank which, like the first curve flank, extends from the offset portion with the positive curved transport path pitch, is applied tangentially against the pusher dog on the outside and ascends parallel to the first curve flank with the desired course of the positive curved transport path pitch, so that the pusher dog moves in and along the positively ascending curved transport path.

Owing to the particular form of the entry portion of the transport body, it is not necessary to synchronize a unit for supplying a carrier to the transport body with the transport body itself via a fixed coupling or a path controller in particular in the manner of a master-slave synchronization control system. Accordingly, it is here possible to create a significantly less expensive transport system for the rapid transport and also rapid positioning of objects along a transport section with the provision of at least one rotatable transport body. Specifically because the at least one pusher dog is received without difficulty in the curved transport path of the transport body, it is possible to position objects on carriers, which engage via the pusher dogs into the curved transport paths of the transport bodies, with reproducible accuracy at manufacturing stations etc. along a transport section.

Advantageously, at least two transport bodies can further be arranged along the transport section adjacent to one another and spaced apart from one another by a definable or defined distance and can be coupled with one another, wherein the respective curved transport path of the transport bodies is interrupted at the coupling site or sites and at least one carrier is provided with at least two pusher dogs, so that, at any point in time, at least one pusher dog can be arranged or is located in one of the curved transport paths with a positive curved transport path pitch. Further advantageously, the distance between the transport bodies arranged adjacent to one another and coupled with one another is so chosen that each of the pusher dogs of the carrier is always in engagement with one of the two adjacent transport bodies or with the entry region or curved transport path thereof. The transport bodies arranged adjacent to one another can be mounted independently of one another, wherein the problem-free engagement of the pusher dogs into the adjacent rotating transport bodies is possible as a result of their coupling. In addition to individual carriers, it is also possible to provide carrier assemblies, or individual carrier assemblies, which can also have gaps between them and which are moved along the transport bodies, in particular adjacent transport bodies coupled with one another, and/or are positioned accurately at manufacturing stations or other stations. The transport bodies can also be provided with respective independent drive devices, wherein the curved transport path is interrupted in the transfer region of the adjacent transport bodies by the spacing of the adjacent transport bodies. A carrier can also further be arranged or located at any point in time with at least one of its at least two pusher dogs in one of the curved transport paths with a positive curved transport path pitch.

BRIEF DESCRIPTION OF THE DRAWINGS

For the further explanation of the invention, exemplary embodiments thereof are described hereinbelow with reference to the drawings, in which.

DETAILED DESCRIPTION OF THE INVENTION

Figure 1:
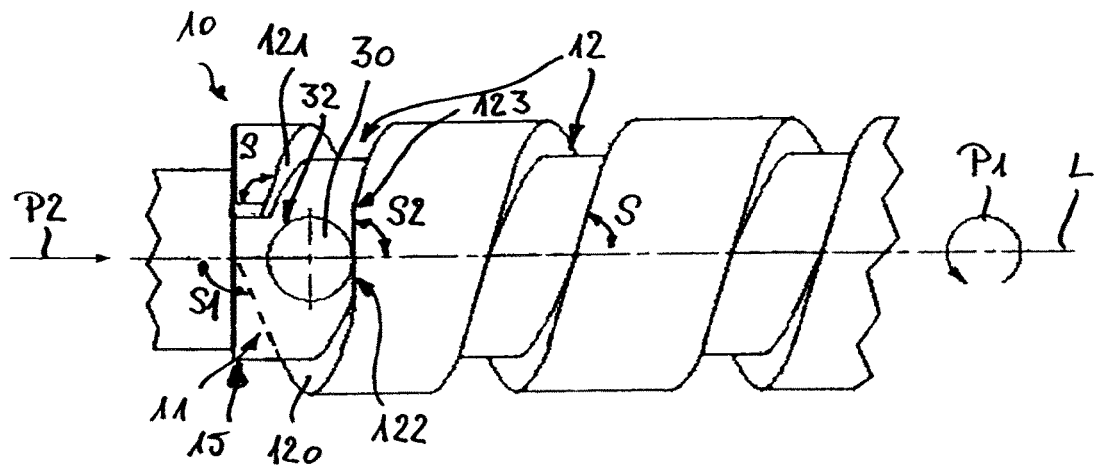
FIG. 1 is a perspective view of a first embodiment of a transport body according to the invention with a curved transport path of a transport system according to the invention for transporting and/or positioning objects along a transport section in a first position, wherein the transport body is in a catch position for a pusher dog of a carrier for transporting the objects.
Figure 2:
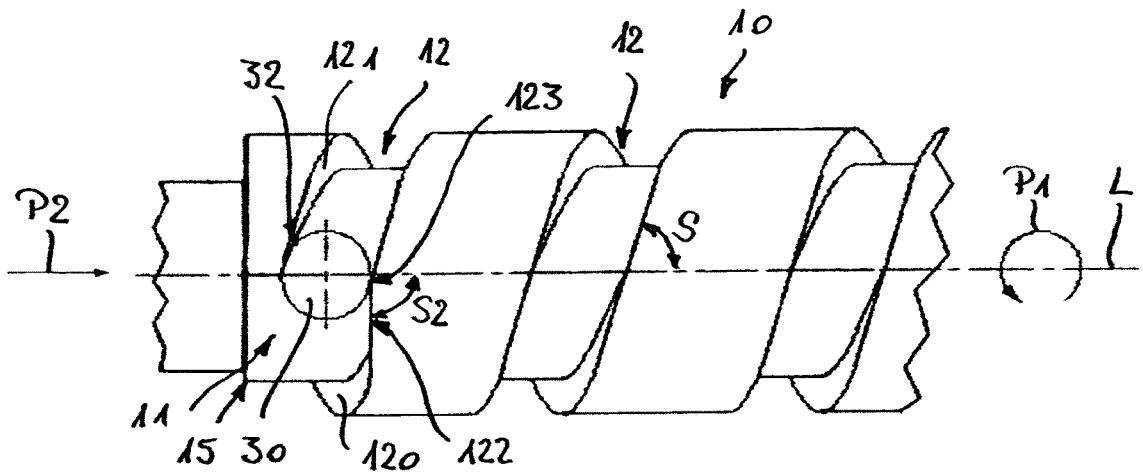
FIG. 2 is a perspective view of the transport body according to FIG. 1 in a position rotated further in the direction of rotation, or transport direction, in which the pusher dog has been caught in the curved transport path.

FIGS. 1 and 2 each show a transport body 10 which is part of a transport system 1 as is shown by way of example in FIGS. 3, 5, 6, 7 in different embodiment variants. The transport system serves to transport objects along a transport section 2. The objects are thereby arranged, for example, on carriers 3, such as, for example, carriages or pallets, which are transported via the transport system along the transport section to different stations, optionally at different speeds. The carriers 3 with the objects, such as products to be processed, located thereon are usually conveyed via the transport system 1 from one manufacturing station to the next along the transport section 2. At the manufacturing stations, the carriers with the products to be processed or manufactured are brought into position very accurately by the transport bodies with a reproducible accuracy in the 100th millimeter range. This is made possible by the special type of transport body 10, or the entry region 11 thereof.

Figure 4:
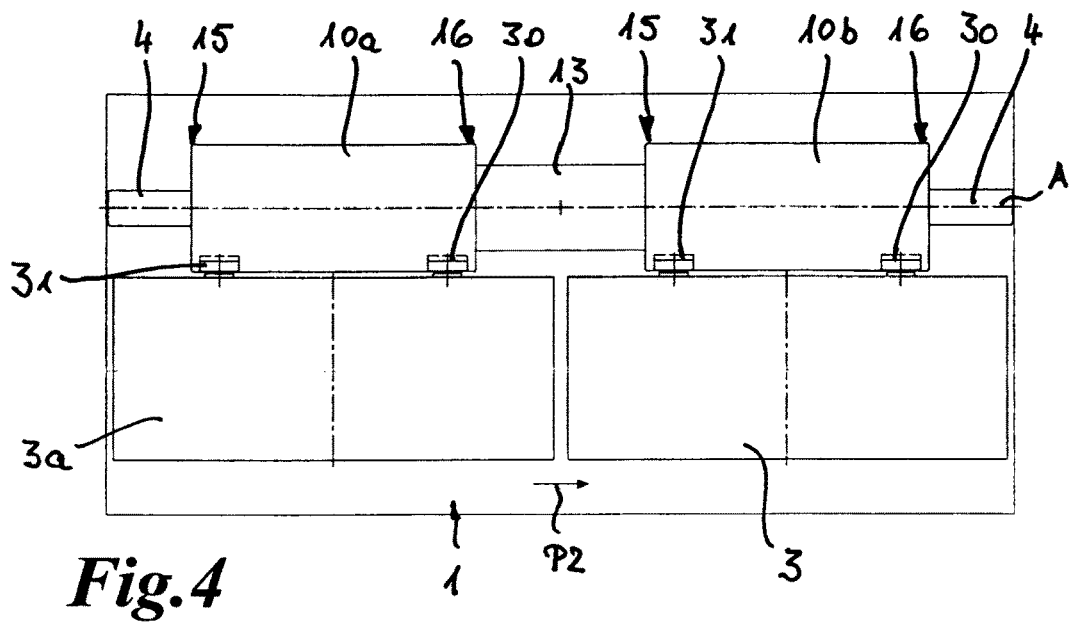
FIG. 4 is a detail view of the transport system according to FIG. 3 in the region of two carriers, configured for transporting objects along the transport section, which engage via pusher dogs in transport bodies according to the invention.

The transport body 10 has an entry end 15 and an exit end 16 (see FIG. 4). Each of the carriers 3 has, as is apparent in particular from the detail view in FIG. 4, at least one roller-like pusher dog, in this exemplary embodiment two roller-like pusher dogs 30, 31, which are arranged on the carrier 3 spaced apart from one another. The pusher dogs pass over an entry region 11 and, from there, into a curved transport path 12 of the transport body 10. The curved transport path 12 is defined by two curve flanks 120, 121 extending parallel to one another, or substantially parallel to one another. The curved transport path 12 is in the form of a groove extending helically, with respect to the transport direction, which is indicated by arrow P2, with a positive curved transport path pitch S along the longitudinal extent of the transport body 10. The positive curved transport path pitch S is understood as being the angle with respect to the axis of rotation, which at the same time is the longitudinal axis L of the transport body 10. This positive curved transport path pitch S can be constant over the entire longitudinal extent or can also vary. By changing the curved transport path pitch, the speed of the movement of the carrier 3 along the transport section 2 can be set or changed. Of course, the speed of rotation of the transport body 10 rotating about its longitudinal axis L, here counterclockwise (see arrow P1), also determines the speed of advance of the carrier 3 in the transport direction (see arrow P2). By changing the speed of rotation of the rotating transport body 10, the speed of the linear movement of the carriers 3 along the transport section 2 can of course likewise be influenced. A rotation of the transport body 10 clockwise is likewise also possible. In principle, operation of the transport system both counterclockwise and clockwise is possible.

In order to permit optimal entry of the roller-like pusher dogs 30, 31 of the carrier 3 into the curved transport path 12 of the transport body 10 in the entry region 11, the entry region is so configured that the first curve flank 120 initially ascends from the entry end 15 of the transport body 10 with a positive pitch S1. The positive pitch S1 can correspond to the positive curved transport path pitch S, but it may also be different therefrom. The first curve flank 120 merges from the positive pitch S1 into an offset portion 122, which here has a pitch S2 of approximately infinite or a small negative or a large positive pitch, again shown in FIGS. 1 and 2 as the angle with respect to the axis of rotation or longitudinal axis L of the transport body 10. As is further apparent from FIG. 2, this offset portion 122 which here has a pitch of approximately infinite merges into the positive curved transport path pitch S, with which the first curve flank 120 extends further. The second curve flank 121 is behind the first curve flank 120, that is to say begins offset with respect thereto, namely at the level of a transition region 123 from the offset portion 122 with its pitch S2 into the positive curved transport path pitch S of the first curve flank 120. From there, the two curve flanks 120, 121 laterally delimit the curved transport path 12 and follow the positive curved transport path pitch S. In the embodiment variant shown in FIGS. 1 and 2, the second curve flank 121 begins with the positive curved transport path pitch S. The two curve flanks 120, 121 thus extend from there parallel to one another, or approximately parallel to one another, with the positive curved transport path pitch S. This is likewise apparent from FIG. 1 and also from the position of the transport body 10 rotated further in the direction of rotation, that is to say in the direction of arrow P1, in FIG. 2.

As a result of the offset in the course of the first curve flank 120 by the provision of the offset portion 122 extending with the second pitch S2, which in particular can be approximately infinite or infinite, the roller-like pusher dog 30 or 31 moves a long way into the longitudinal course of the transport body 10 even before it reaches the position for feeding into the curved transport path 12, which is shown as the catch position in FIG. 1. If the pusher dog 30 or 31 first enters the entry region 11 obliquely on the first curve flank ascending with the positive curved transport path pitch S1, it follows that curve flank until it reaches the feed or catch position, in which it is securely fed into the curved transport path 12. FIG. 2 shows the position of the roller-like pusher dog 30 in which it has already been fed in. By the provision of the offset portion 122, a kind of funnel from the entry region 11 into the transport path 12 is produced, so that, as the transport body 10 rotates further in the direction of rotation thereof (see arrow P1), the respective roller-like pusher dog 30 or 31 of the carrier 3 moves purposively and in a defined manner into the curved transport path 12 after it has run onto the offset portion 122. On further turning or rotation of the transport body 10, the second curve flank 121 is applied tangentially against the outer side 32 of the roller-like pusher dog 30 or 31, without thereby subjecting it to an impact. Rather, the roller-like pusher dog 30 or 31 is thereby carefully guided or pushed into the curved transport path 12, which is delimited laterally by the two curve flanks 120, 121. It is able to move forwards in the transport direction, see arrow P2, within the curved transport path 12 during the rotation of the transport body 10, as far as the exit end 16 of the transport body 10 opposite the entry end 15. Because the first curve flank 120 ascends directly with the positive pitch S1 from the entry end 15 of the transport body 10 and continues to ascend continuously in an offset manner, a groove region extending parallel or perpendicular to the axis of rotation is not required in order to make feeding in of the roller-like pusher dog 30 or 31 possible.

The offset portion 122 extends with a pitch S2 of in particular infinite or even a negative pitch or at least a pitch which is greater than the positive curved transport path pitch S, thus wherein S2≈∞ or S2<0 or S2>S. By the provision of the entry region 11, in which the first curve flank 120 ascends with the positive pitch S1 from the entry end 15 of the transport body 10 and is thereby in advance of the second curve flank 121, and has in its course an offset as a result of the offset portion 122, wherein it merges thereafter, offset with respect to the initial course, into the positive curved transport pitch S, it is possible for the at least one roller-like pusher dog 30 or 31 to feed into the curved transport path 12 without difficulty. Furthermore, it is possible, without jamming and without the risk of damage to the carrier 3 or the roller-like pusher dogs 30, 31 thereof, which are rigidly attached in terms of their positioning to the carrier 3, to engage with one roller-like pusher dog 30 of the carriers into the curved transport path 12 of an adjacent transport body 10b while the other roller-like pusher dog 31 of the carrier 3 is still in engagement in the curved transport path 12 of the preceding transport body 10a, as is apparent, for example, from FIG. 4. With the distance shown therein between the two adjacent transport bodies 10a, 10b, which can be configured as shown in FIGS. 1 and 2, the carrier 3a shown on the left in FIG. 4 can simultaneously engage with its two roller-like pusher dogs 30, 31 into the curved transport paths of the two adjacent transport bodies 10a, 10b, accordingly with the roller-like pusher dog 31 still in the curved transport path of the transport body 10a, while the roller-like pusher dog 30 already engages into the curved transport path of the transport body 10b.

The individual transport bodies 10 can be not only be arranged separately side by side along the transport section 2 over at least one transfer section, such as one or more conveyor belts 4, conveyor chains or other suitable conveyor means, but can also be connected together, for example via a connecting portion 13, as shown in FIG. 4. Specifically when working with a plurality of successive manufacturing steps with reproducible accuracy in respect of the positioning of the carriers in the 100th millimeter range, the coupling of adjacent transport bodies 10, or 10a, 10b, which in particular are to be arranged in the region of a manufacturing station or of adjacent manufacturing stations which are connected together, is found to be economically advantageous, since a defined distance of the transport bodies from one another as well as synchronism of the rotating transport bodies 10 arranged adjacent to one another can thereby be made possible with only one drive device. Of course, it is also possible, for example, to provide at least two transport bodies 10 arranged adjacent to one another at a defined distance with in each case independent, associated drive devices, which on the one hand can work independently of one another but which on the other hand can also generate synchronism, in order to be able to transfer a carrier with its at least two pusher dogs from the working region of one transport body to the adjacent working region of an adjacent transport body. The two transport bodies are thereby still arranged along an axis A and rotate about that axis of rotation.

Figure 3:
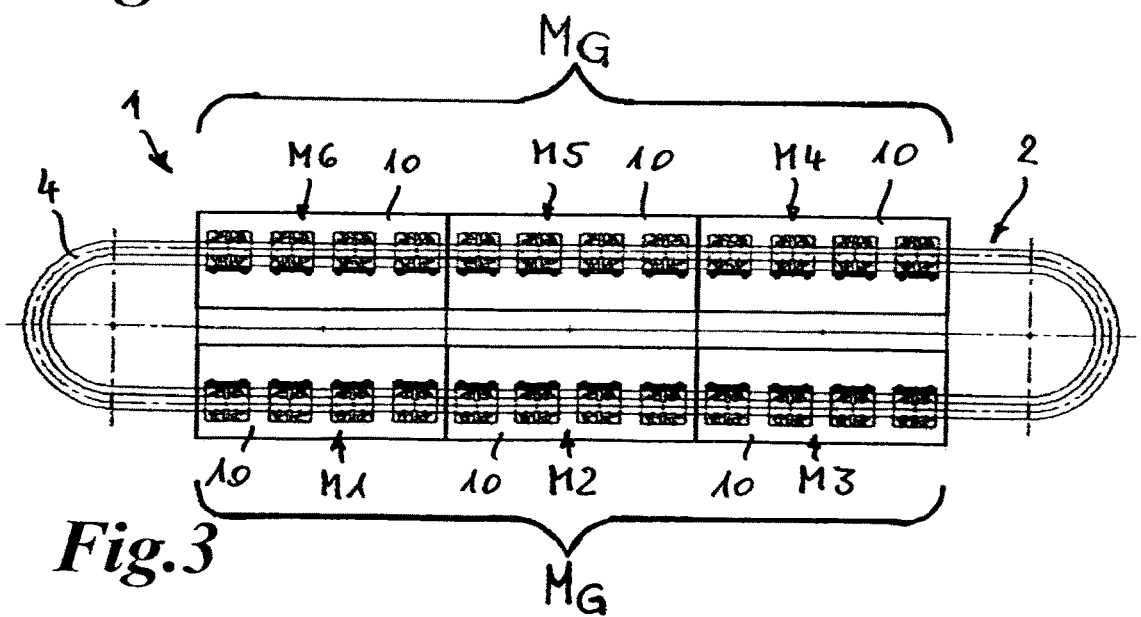
FIG. 3 is a plan view of a first embodiment of a transport system according to the invention, comprising six modules which are arranged along a revolving transport section.
Figure 5:
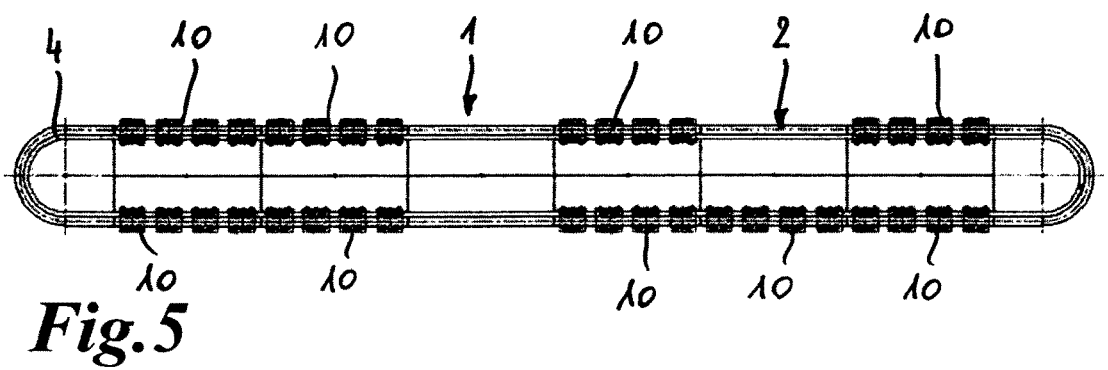
FIG. 5 is a plan view of a second embodiment of a transport system according to the invention having a plurality of modules along a revolving transport section.
Figure 6:
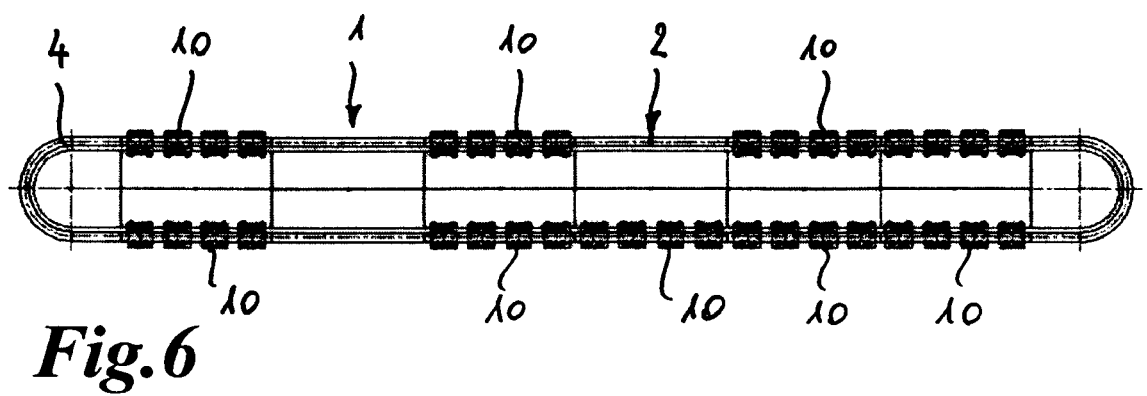
FIG. 6 shows a third embodiment of a transport system according to the invention having a plurality of modules along a revolving transport section.
Figure 7:
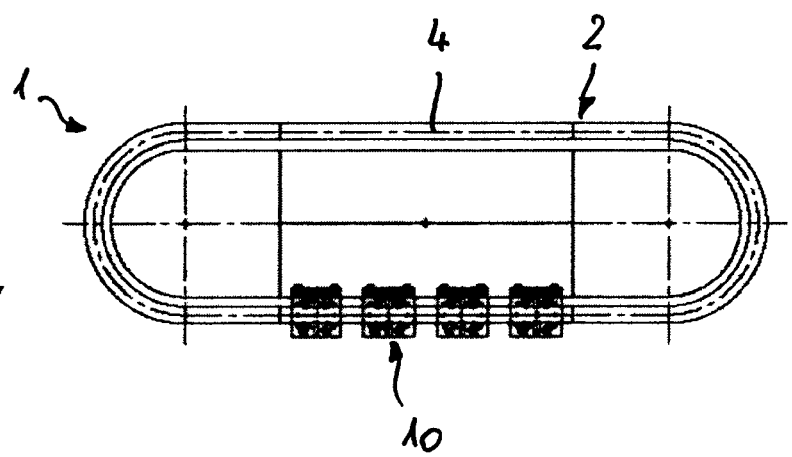
FIG. 7 shows a fourth embodiment of a transport system according to the invention having only one module along a revolving transport section.

FIGS. 5, 6 and 7 each show a different number of transport bodies 10 along the respective revolving transport section 2. This is intended to clearly illustrate that very different arrangements of transport bodies 10 in conjunction with one or more transfer sections 4 of the respective revolving transport section 2 can be provided. This also has the structure of the transport section 2 according to FIG. 3, wherein three adjacent transport bodies 10, by way of example, are there combined to form a total module $M_G$ and the individual modules M1 to M3 and M4 to M6, which in FIG. 3 are arranged by way of example along the revolving transport section 2, can be arranged adjacent to one another or spaced apart from one another. It is likewise possible to provide only one transport body 10 and one transfer section 4, as shown in FIG. 7. Furthermore, only modules M1 and M4, for example, can be provided, and the remaining modules can be omitted or, for example, modules M1, M2 and M4, M5 can be provided and the remaining two modules M3 and M6 can be omitted. For example, coupled modules, such as modules M1 and M2, can have a drive device for driving them, and module M3 can have a separate drive device for driving it. Apart from the embodiment variants shown in FIGS. 3 and 5 to 7 of very different variants of transport bodies 10 along revolving transport sections 2, many further variants can also be formed. As a result, a suitable adaptation to very different specifications in manufacturing installations or at manufacturing stations can be accommodated, and rapid adaptation to very different requirements on the part of the manufacturing installations can inexpensively be made.

Figure 4A:
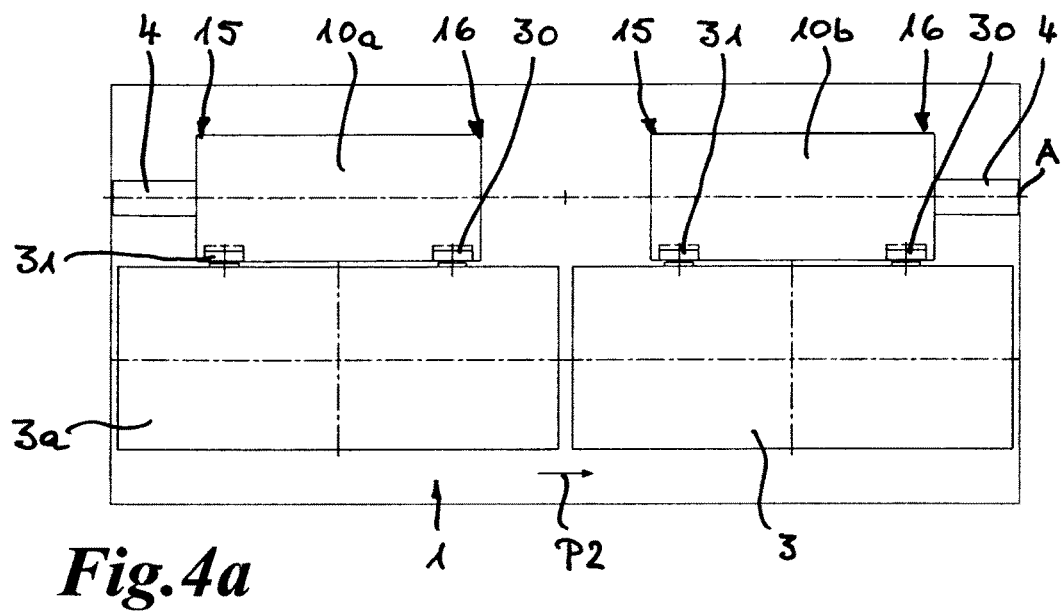
FIG. 4a is a detail view of the transport system according to FIG. 3, similar to FIG. 4, wherein, in contrast thereto, the two adjacent transport bodies are not mechanically coupled via a connecting portion.

It is further possible to provide not only individual modules or single modules M1 to M6, but also, for example, module M1 with a drive device and modules M2 and M3 as expansion modules which are coupled to module M1 in order to lengthen the curved transport path thereof. The individual transport bodies 10 or 10a, 10b can be mounted independently of one another and coupled with one another at the ends at coupling points, as indicated by the connecting portion 13, which serves for mechanical coupling. In the embodiment variant according to FIG. 4a, the adjacent transport bodies 10a, 10b are coupled only electrically; mechanical coupling via the connecting portion 13 is absent therein. The curved transport path 12 is interrupted at the coupling points, as is shown in FIG. 4. Therefore, it is not possible in the region of the gap between the adjacent transport bodies 10, 10a, 10b to use carriers 3, 3a with only one roller-like pusher dog 30, 31; rather, the carriers 3, 3a are therefore each provided with two roller-like pusher dogs 30, 31. By providing the carriers with at least two pusher dogs, it can be ensured that, at any point in time, at least one pusher dog is located in one of the curved transport paths 12 with a positive curved transport path pitch S.

The transport body 10 shown in FIGS. 1 and 2 can, as shown therein, be configured with its curved transport path as a cylinder or barrel curve; it is likewise possible to configure it as a globoid curve, for example. Mixed forms can also be provided. Owing to the particular form of the entry region 11 into the curved transport path 12 of the transport body 10, it is possible in any case to provide a gentle, jerk-free and wear-optimized movement of the carrier 3 that is movable along the transport section 2 by the transport system 1, the in particular roller-like pusher dogs 30, 31 of which engage into the curved transport path 12. During entry, the transport body 10 can rotate or stand still, wherein in both cases the pusher dogs 30, 31 are able to enter the respective curved transport path 12 of the respective transport body 10 without difficulty.

In addition to the embodiment variants described hereinbefore and shown in the figures of transport systems for transporting and/or positioning objects along a transport section, wherein the transport system comprises at least one rotatable transport body having an entry end and an exit end and at least one curved transport path which is delimited by at least one curve flank pair and which, as seen in the linear transport direction, has at least one positive curved transport path pitch throughout and into which there can engage or there engages at least one pusher dog of a carrier that is movable along the transport section, wherein the at least one transport body has at least one entry region for the entry of the at least one pusher dog into the curved transport path, many further variants are also possible, in particular also any desired combinations of the above-mentioned features, wherein in the entry region of the transport body a first curve flank of the curve flank pair is provided in advance of a second curve flank, and wherein only the leading first curve flank of the curve flank pair is provided in the entry region, wherein this first curve flank ascends with a positive pitch from the entry end of the transport body and merges with an offset portion into the curved transport path delimited by the two curve flanks and ascending with the positive curved transport path pitch. The first curve flank extends in the transport direction before and following the offset portion with a positive pitch, wherein it ascends after the offset portion with the curved transport path pitch and before the offset portion optionally with a positive pitch that is different therefrom.

LIST OF REFERENCE SIGNS 1 transport system
2 transport section
3 carrier
3a carrier
4 transfer section (conveyor belt, conveyor chain, etc.)
10 transport body
10a transport body
10b transport body
11 entry region
12 curved transport path
13 connecting portion
15 entry end
16 exit end
30 roller-like pusher dog
31 roller-like pusher dog
32 outer side
120 first curve flank
121 second curve flank
122 offset portion
123 transition region
L longitudinal axis/axis of rotation
A axis/axis of rotation
S positive curved transport path pitch
S1 first pitch (positive pitch) of 120
S2 second pitch at 122
P1 arrow/direction of rotation of 10
P2 arrow/transport direction
M1 to M6 single modules
$M_G$ total module

What is claimed is:

1. A transport system for transporting and/or positioning objects along a transport section, wherein the transport system comprises: at least one rotatable transport body having an entry end and an exit end and having at least one ascending curved transport path which is delimited by at least one curve flank pair and which has at least one positive curved transport path pitch (S) in the linear transport direction and into which there can engage or there engages at least one pusher dog of a carrier that is movable along the transport section, wherein the at least one transport body has at least one entry region for the entry of the at least one pusher dog (30, 31) into the curved transport path, wherein only one a first curve flank of the curve flank pair is provided in the entry region, wherein the first curve flank ascends with a positive pitch (S1) from the entry end of the transport body and merges with an offset portion into the curved transport path delimited by the two curve flanks and ascending with the positive curved transport path pitch (S).

2. The transport system according to claim 1, wherein the positive pitch (S1) with which the first curve flank ascends from the entry end of the transport body corresponds to the positive curved transport path pitch (S) of the ascending curved transport path, or wherein the positive pitch (S1) with which the first curve flank ascends from the entry end of the transport body is unequal to the positive curved transport path pitch (S) of the ascending curved transport path.

3. The transport system according to claim 1, wherein the second curve flank of the curve flank pair with the positive curved transport path pitch (S) begins at the level of a transition region of the first curve flank from the offset portion into the curved transport path ascending with the positive curved transport path pitch (S).

4. The transport system according to claim 1, wherein the curved transport path pitch (S) of the curved transport path that is positive throughout in the linear transport direction is constant at least in some regions or is changeable over the longitudinal extent of the transport body.

5. The transport system according to claim 1, wherein a revolving transport section comprises at least one transport body and at least one transfer section, which can be connected or are connected to one another.

6. The transport system according to claim 1, wherein at least two transport bodies can be arranged or are arranged adjacent to one another at a definable or defined distance from one another and can be coupled or are coupled with one another, wherein the respective curved transport path of the transport bodies is interrupted at the coupling point or points and at least one carrier is provided with at least two pusher dogs, so that, at any point in time, at least one pusher dog can be arranged or is located in one of the curved transport paths with the at least one positive curved transport path pitch (S).

7. The transport system according to claim 6, wherein the at least two transport bodies, as a total module ($M_G$), can be provided or are provided with only one drive device.

8. The transport system according to claim 1, wherein at least two transport bodies can be arranged or are arranged adjacent to one another at a definable or defined distance and can be provided or are provided with respective independent drive devices, wherein in the transfer region of the adjacent transport bodies, the curved transport path is interrupted by the spacing of the adjacent transport bodies and at least one carrier is provided with at least two pusher dogs, so that, at any point in time, at least one pusher dog can be arranged or is located in one of the curved transport paths with a positive curved transport path pitch.

9. The transport system according to claim 1, wherein the curved transport path of the transport body is configured as a grooved curve and/or web curve and/or bead curve or in the manner of a groove with two curve flanks of the curve flank pair.

10. A transport body for a transport system according to claim 1, wherein the transport body has an entry end and an exit end, at least one ascending curved transport path which is delimited by at least one curve flank pair and has in the linear transport direction at least one positive curved transport path pitch (S), and at least one entry region for the entry of at least one pusher dog of a carrier of the transport system into the curved transport path, wherein in the entry region of the transport body, the first curve flank is in advance of the second curve flank of the curve flank pair, wherein only the leading first curve flank of the curve flank pair is provided in the entry region, wherein the first curve flank ascends with a positive pitch (S1) from the entry end of the transport body and merges with an offset portion into the curved transport path delimited by the two curve flanks and ascending with the positive curved transport path pitch (S).

11. The transport body according to claim 10, wherein the second curve flank of the curve flank pair with the positive transport curve path pitch (S) begins at the level of a transition region of the first curve flank from the offset portion into the curved transport path ascending with a positive curved transport path pitch (S).

12. The transport body according to claim 10, wherein the offset portion of the first curve flank has a pitch (S2) that is infinite, negative or that exceeds the positive curved transport path pitch (S).

13. The transport body according to claim 10, wherein the positive pitch (S1) with which the first curve flank in advance of the second curve flank ascends from the entry end of the transport body corresponds to the positive curved transport path pitch (S) of the ascending curved transport path or is different therefrom.

14. The transport body according to claim 10, wherein the curved transport path of the transport body is configured as a cylinder or barrel curve and/or globoid curve.

15. The transport system according to claim 2, wherein the second curve flank of the curve flank pair with the positive curved transport path pitch (S) begins at the level of a transition region of the first curve flank from the offset portion into the curved transport path ascending with the positive curved transport path pitch (S), wherein the curved transport path pitch (S) of the curved transport path that is positive throughout in the linear transport direction is constant at least in some regions or is changeable over the longitudinal extent of the transport body, wherein a revolving transport section comprises at least one transport body and at least one transfer section, which can be connected or are connected to one another.

16. The transport system according to claim 15, wherein at least two transport bodies can be arranged or are arranged adjacent to one another at a definable or defined distance from one another and can be coupled or are coupled with one another, wherein the respective curved transport path of the transport bodies is interrupted at the coupling point or points and at least one carrier is provided with at least two pusher dogs, so that, at any point in time, at least one pusher dog can be arranged or is located in one of the curved transport paths with the at least one positive curved transport path pitch (S), wherein the at least two transport bodies, as a total module ($M_G$), can be provided or are provided with only one drive device.

17. The transport system according to claim 15, wherein at least two transport bodies can be arranged or are arranged adjacent to one another at a definable or defined distance and can be provided or are provided with respective independent drive devices, wherein in the transfer region of the adjacent transport bodies, the curved transport path is interrupted by the spacing of the adjacent transport bodies and at least one carrier is provided with at least two pusher dogs, so that, at any point in time, at least one pusher dog can be arranged or is located in one of the curved transport paths with a positive curved transport path pitch (S), wherein the curved transport path of the transport body is configured as a grooved curve and/or web curve and/or bead curve or in the manner of a groove with two curve flanks of the curve flank pair, wherein the transport body has an entry end and an exit end, at least one ascending curved transport path which is delimited by at least one curve flank pair and has in the linear transport direction at least one positive curved transport path pitch (S), and at least one entry region for the entry of at least one pusher dog of a carrier of the transport system into the curved transport path, wherein in the entry region of the transport body, the first curve flank is in advance of the second curve flank of the curve flank pair, wherein only the leading first curve flank of the curve flank pair is provided in the entry region, wherein the first curve flank ascends with a positive pitch (S1) from the entry end of the transport body and merges with an offset portion into the curved transport path delimited by the two curve flanks and ascending with the positive curved transport path pitch (S).

18. The transport body according to claim 10, wherein the second curve flank of the curve flank pair with the positive transport curve path pitch (S) begins at the level of a transition region of the first curve flank from the offset portion into the curved transport path ascending with a positive curved transport path pitch (S), wherein the offset portion of the first curve flank has a pitch (S2) that is infinite, negative or that exceeds the positive curved transport path pitch (S).

19. The transport body according to claim 18, wherein the positive pitch (S1) with which the first curve flank in advance of the second curve flank ascends from the entry end of the transport body corresponds to the positive curved transport path pitch (S) of the ascending curved transport path or is different therefrom, wherein the curved transport path of the transport body is configured as a cylinder or barrel curve and/or globoid curve.

* * * * *